United States Patent
Mitra et al.

(10) Patent No.: US 10,149,022 B2
(45) Date of Patent: Dec. 4, 2018

(54) METHOD AND SYSTEM OF AUTO-TAGGING BRANDS OF TELEVISION ADVERTISEMENTS

(71) Applicant: Silveredge Technologies Pvt. Ltd., Gurgaon (IN)

(72) Inventors: Debasish Mitra, Gurgaon (IN); Hitesh Chawla, Gurgaon (IN)

(73) Assignee: Silveredge Technologies Pvt. Ltd., Gurgaon (IN)

( * ) Notice: Subject to any disclaimer, the term of this patent is extended or adjusted under 35 U.S.C. 154(b) by 0 days.

(21) Appl. No.: 15/454,835

(22) Filed: Mar. 9, 2017

(65) Prior Publication Data

US 2017/0264971 A1  Sep. 14, 2017

(30) Foreign Application Priority Data

Mar. 9, 2016 (IN) .............................. 201611008282

(51) Int. Cl.
  *H04N 21/435* (2011.01)
  *H04N 21/81* (2011.01)
  *H04N 21/8358* (2011.01)
  *H04N 21/44* (2011.01)

(52) U.S. Cl.
  CPC ......... *H04N 21/812* (2013.01); *H04N 21/435* (2013.01); *H04N 21/44008* (2013.01); *H04N 21/8358* (2013.01)

(58) Field of Classification Search
  CPC ............... H04N 21/812; H04N 21/435; H04N 21/44008; H04N 21/8358
  USPC .......................................................... 725/18
  See application file for complete search history.

(56) References Cited

U.S. PATENT DOCUMENTS

| | | | | |
|---|---|---|---|---|
| 5,019,899 A | * | 5/1991 | Boles | G06K 9/00711 348/184 |
| 6,002,443 A | * | 12/1999 | Iggulden | H04N 5/44 348/460 |
| 7,194,752 B1 | * | 3/2007 | Kenyon | G06K 9/0055 382/118 |
| 7,627,878 B2 | * | 12/2009 | Pouliot | H04H 20/14 725/22 |
| 7,669,056 B2 | * | 2/2010 | Frank | G06Q 30/02 380/229 |
| 8,793,808 B2 | * | 7/2014 | Boccon-Gibod | G06F 21/10 705/57 |
| 9,258,604 B1 | * | 2/2016 | Bilobrov | H04N 21/4586 |

(Continued)

*Primary Examiner* — Nathan Flynn
*Assistant Examiner* — Tung T Trinh
(74) *Attorney, Agent, or Firm* — Kolisch Hartwell, P.C.

(57) ABSTRACT

A system and method for automated tagging of one or more advertisements broadcasted on a channel in real time includes a step of detecting the one or more advertisements broadcasted on the channel, and another step of fetching a set of prominent frames and a pre-defined section of an audio clip. The set of prominent frames and the pre-defined section of the audio clip correspond to a detected advertisement. The method also includes another step of retrieving plural features. The plural features corresponds to the set of prominent frames and the pre-defined section of the audio clip. The method also includes another step of comparing each of the plurality of features with corresponding pre-defined set of features. The method also includes another step of tagging the detected advertisement with a unique tag.

16 Claims, 6 Drawing Sheets

(56) References Cited

U.S. PATENT DOCUMENTS

| | | | | |
|---|---|---|---|---|
| 9,460,204 B2* | 10/2016 | Larsen | ................ | H04H 60/375 |
| 2003/0101144 A1* | 5/2003 | Moreno | ............ | G06F 17/30017 |
| | | | | 705/62 |
| 2006/0190970 A1* | 8/2006 | Hellman | ................ | H04N 7/163 |
| | | | | 725/75 |
| 2006/0245724 A1* | 11/2006 | Hwang | .................... | H04N 5/76 |
| | | | | 386/241 |
| 2007/0098212 A1* | 5/2007 | Pan | ........................ | H04N 19/48 |
| | | | | 382/100 |
| 2008/0060036 A1* | 3/2008 | Cox | ................ | G06F 17/30017 |
| | | | | 725/110 |
| 2008/0062315 A1* | 3/2008 | Oostveen | ................ | G10L 25/48 |
| | | | | 348/500 |
| 2008/0267584 A1* | 10/2008 | Green | .................... | H04N 5/76 |
| | | | | 386/250 |
| 2009/0324199 A1* | 12/2009 | Haitsma | ............. | G06K 9/00744 |
| | | | | 386/241 |
| 2014/0013352 A1* | 1/2014 | Shavit | ................ | H04N 21/8358 |
| | | | | 725/34 |
| 2015/0003739 A1* | 1/2015 | Cho | .................. | G06K 9/00718 |
| | | | | 382/195 |
| 2016/0037232 A1* | 2/2016 | Hu | ........................ | H04N 21/812 |
| | | | | 725/34 |
| 2016/0286285 A1* | 9/2016 | Geyzel | ................ | H04N 21/835 |
| 2017/0243323 A1* | 8/2017 | Croxford | ............. | H04N 13/106 |

* cited by examiner

METHOD AND SYSTEM OF AUTO-TAGGING BRANDS OF TELEVISION ADVERTISEMENTS

INTRODUCTION

The present invention relates to the field of digital fingerprinting of media content and, in particular, relates to auto-tagging of one or more advertisements broadcasted in real time.

A television broadcast essentially consists of scheduled programs and sponsored advertisements. Each advertisement is generally scheduled to run for 10 to 35 seconds approximately on multiple channels. The advertisements run in between the scheduled broadcast of the program on each channel. These advertisements identify themselves by a unique brand name. These brand names are mapped and tagged manually after their detection. Although, with the number of channels growing day by day and their slots are increasing with time, it has become difficult to tag each advertisement manually. This has created a need to automatically identify and tag a brand of each advertisement broadcasted on their channel and their competitive channels.

The automated detection of advertisement has long been an area of great interest. The other use of such automated content recognition technology is by those parties with a need to verify that the advertisement associated with a specific brand have actually been broadcast as contracted for on each of numerous channels, time slots and markets. In addition, other companies perform research and collect statistics on which companies are running which advertisements in which markets. This data can be for the companies' own use, or for resale. Meanwhile, other firms research commercials to develop more effective advertisements for clients. These types of analysis are usually done on a market-by-market level and require monitoring a large number of channels and markets.

In various prior arts, such advertisement verification or collection procedures were manually performed by human beings during scheduled broadcast time, or by visually searching (fast forwarding, rewinding, etc.) a tape or other record of an earlier broadcast. As can be appreciated, waiting for the advertisement to broadcast, setting up recording equipment to record a broadcast, and/or searching records of broadcast content to verify advertisement content broadcastings can be time consuming, laborious, and costly undertakings. Therefore, there is an unmet need to optimize an automated process of detection and identification of advertisement in live video streams.

These advertisements can be primarily detected through an unsupervised machine learning based approach and a supervised machine learning based approach. The unsupervised machine learning based approach focuses on detection of advertisements by extracting and analyzing digital fingerprints of each advertisement. Similarly, the supervised machine learning based approach focuses on mapping and matching digital fingerprints of each advertisement with a known set of digital fingerprints of corresponding advertisement. Furthermore, these advertisements can be tagged automatically with a unique tag (herein "brand name") for unsupervised detection using predictive analysis.

In US Patent Publication No. 20140013352 a method and system for broadcast ad identification is presented. The method includes the steps of providing fingerprint signatures of each frame in a broadcast video; and designating at least two repeat fingerprint signatures upon detecting at least one fingerprint-signature match from the signatures. Preferably, methods further include: prior to the designating, determining whether the fingerprint signatures correspond to a known ad based upon detecting at least one fingerprint-signature match of the fingerprint signatures with pre-indexed fingerprint signatures of pre-indexed ads. Preferably, method further include creating segments of the fingerprint signatures, ordered according to a timeline temporal proximity of the fingerprint signatures, by grouping at least two fingerprint signatures based on a repeat temporal proximity of at least two repeat fingerprint signatures respective of at least two fingerprint signatures. Preferably, methods further include detecting at least one ad candidate based on an occurrence of at least one repeat segment.

In another U.S. Pat. No. 7,627,878 the method and system for automated auditing of advertising is presented. The timing and placement of advertising on TV, radio or other broadcast media are automatically verified or audited by monitoring and recording channels of TV, radio or broadcast media by storing and tagging discrete portions of segments of the broadcast signals in a database. The system includes a controller, or "dispatcher" server for dispatching the files to an analysis server for performing various mathematical comparisons and statistical correlations on the audio and video signals for positively identifying one or more advertisements of interest. Further, a report is generated, providing particulars about the airing times of the advertisement of interest and whether its content exactly matches the content of a reference advertisement used as the basis for the mathematical comparisons and correlations.

The present systems and methods have several disadvantages. Most of the methods and system rely on manual tagging of new advertisements. This is somewhat slow and requires 24 hour staff support. In addition, manual tagging may be flawed due to shear negligence of any staff member. These prior arts are time consuming, laborious, and costly undertakings. In addition, these prior arts lack the precision and accuracy to one advertisement from another. These prior arts lack any approach and technique for an automated unsupervised detection of any new advertisements.

In light of the above stated discussion, there is a need for a method and system which overcomes the above stated disadvantages.

SUMMARY

In an aspect, the present disclosure provides a method for detecting one or more advertisements broadcasted on a channel in real time. The method includes a step of detection of the one or more advertisements broadcasted on the channel. The method includes another step of fetching of a set of prominent frames and a pre-defined section of an audio clip. The set of prominent frames and the pre-defined section of the audio clip correspond to a detected advertisement. The method includes another step of retrieving of a plurality of features. The plurality of features corresponds to the set of prominent frames and the pre-defined section of the audio clip. The method includes yet another step of comparison of each of the plurality of features with corresponding pre-defined set of features. The method includes yet another step of tagging of the detected advertisement with a unique tag. The detection of the one or more advertisements includes a supervised detection and an unsupervised detection. The plurality of features includes a brand logo displayed in one or more prominent frames of the set of prominent frames. In addition, the plurality of features includes a brand tagline displayed in the one or more prominent frames of the set of prominent frames. Moreover, the plurality of features include a brand tagline recited corresponding to the pre-defined section of the audio clip.

In an embodiment of the present disclosure, the pre-defined set of features is stored in a reference database.

In an embodiment of the present disclosure, the tag is a brand name corresponding to the detected advertisement.

In an embodiment of the present disclosure, the method includes yet another step of extraction of a first set of audio fingerprints and a first set of video fingerprints. The first set of audio fingerprints and the first set of video fingerprints corresponds to a media content broadcasting on the channel. The first set of audio fingerprints and the first set of video fingerprints are extracted sequentially in the real time. Moreover, the extraction of the first set of video fingerprints is done by sequentially extracting one or more prominent fingerprints. The one or more prominent fingerprints corresponds to the one or more prominent frames of a pre-defined number of frames present in the media content for a pre-defined interval of broadcast.

In an embodiment of the present disclosure, the method includes yet another step of generation of a set of digital signature values. The digital signature values correspond to an extracted set of video fingerprints. The generation of each digital signature value of the set of digital signature values is done by dividing each prominent frame of the one or more prominent frames into a pre-defined number of blocks. Further, each block of each prominent frame of the one or more prominent frames is gray scaled. Furthermore, the generation of each digital signature value of the set of digital signature values is done by calculating a first bit value and a second bit value for each block of the prominent frame. In addition, the generation of each digital signature value of the set of digital signature values is done by obtaining a 32 bit digital signature value corresponding to each prominent frame. Each block of the pre-defined number of block has a pre-defined number of pixels. The first bit value and the second bit value is calculated from comparison of a mean and a variance for the pre-defined number of pixels in each block of the prominent frame with a corresponding mean and variance for a master frame. The corresponding mean and variance for the master frame is present in the master database. The 32 bit digital signature value is obtained by sequentially arranging the first bit value and the second bit value for each block of the pre-defined number of blocks of the prominent frame.

In an embodiment of the present disclosure, the first bit value and the second bit value are assigned a binary 0 when the mean and the variance for each block of the prominent frame is less the corresponding mean and variance of each master frame.

In another embodiment of the present disclosure, the first bit value and the second bit value are assigned a binary 1 when the mean and the variance for each block of the prominent frame is greater than the corresponding mean and variance of each master frame.

In an embodiment of the present disclosure, the method includes yet another step of storage of a generated set of digital signature values, the first set of audio fingerprints and the first set of video fingerprints in a first database and a second database.

In an embodiment of the present disclosure, the method includes yet another step of updating of a first metadata comprising the set of digital signature values and the first set of video fingerprints corresponding to a detected advertisement in a master database for an unsupervised detection.

In another aspect, the present disclosure provides a computer system. The computer system includes one or more processors and a memory. The memory is coupled to the one or more processors. The memory is used to store instructions. The instructions in the memory when executed by the one or more processors cause the one or more processors to perform a method. The one or more processors perform the method for detecting one or more advertisements broadcasted on a channel in real time. The method includes a step of detection of the one or more advertisements broadcasted on the channel. The method includes another step of fetching of a set of prominent frames and a pre-defined section of an audio clip. The set of prominent frames and the pre-defined section of the audio clip correspond to a detected advertisement. The method includes another step of retrieving of a plurality of features. The plurality of features corresponds to the set of prominent frames and the pre-defined section of the audio clip. The method includes yet another step of comparison of each of the plurality of features with corresponding pre-defined set of features. The method includes yet another step of tagging of the detected advertisement with a unique tag. The detection of the one or more advertisements includes a supervised detection and an unsupervised detection. The plurality of features includes a brand logo displayed in one or more prominent frames of the set of prominent frames. In addition, the plurality of features includes a brand tagline displayed in the one or more prominent frames of the set of prominent frames. Moreover, the plurality of features include a brand tagline recited corresponding to the pre-defined section of the audio clip.

In yet another aspect, the present disclosure provides a computer-readable storage medium. The computer readable storage medium enables encoding of computer executable instructions. The computer executable instructions when executed by at least one processor perform a method. The at least one processor performs the method for detecting one or more advertisements broadcasted on a channel in real time. The method includes a step of detection of the one or more advertisements broadcasted on the channel. The method includes another step of fetching of a set of prominent frames and a pre-defined section of an audio clip. The set of prominent frames and the pre-defined section of the audio clip correspond to a detected advertisement. The method includes another step of retrieving of a plurality of features. The plurality of features corresponds to the set of prominent frames and the pre-defined section of the audio clip. The method includes yet another step of comparison of each of the plurality of features with corresponding pre-defined set of features. The method includes yet another step of tagging of the detected advertisement with a unique tag. The detection of the one or more advertisements includes a supervised detection and an unsupervised detection. The plurality of features includes a brand logo displayed in one or more prominent frames of the set of prominent frames. In addition, the plurality of features includes a brand tagline displayed in the one or more prominent frames of the set of prominent frames. Moreover, the plurality of features include a brand tagline recited corresponding to the pre-defined section of the audio clip.

BRIEF DESCRIPTION OF THE DRAWINGS

Figure 1A:
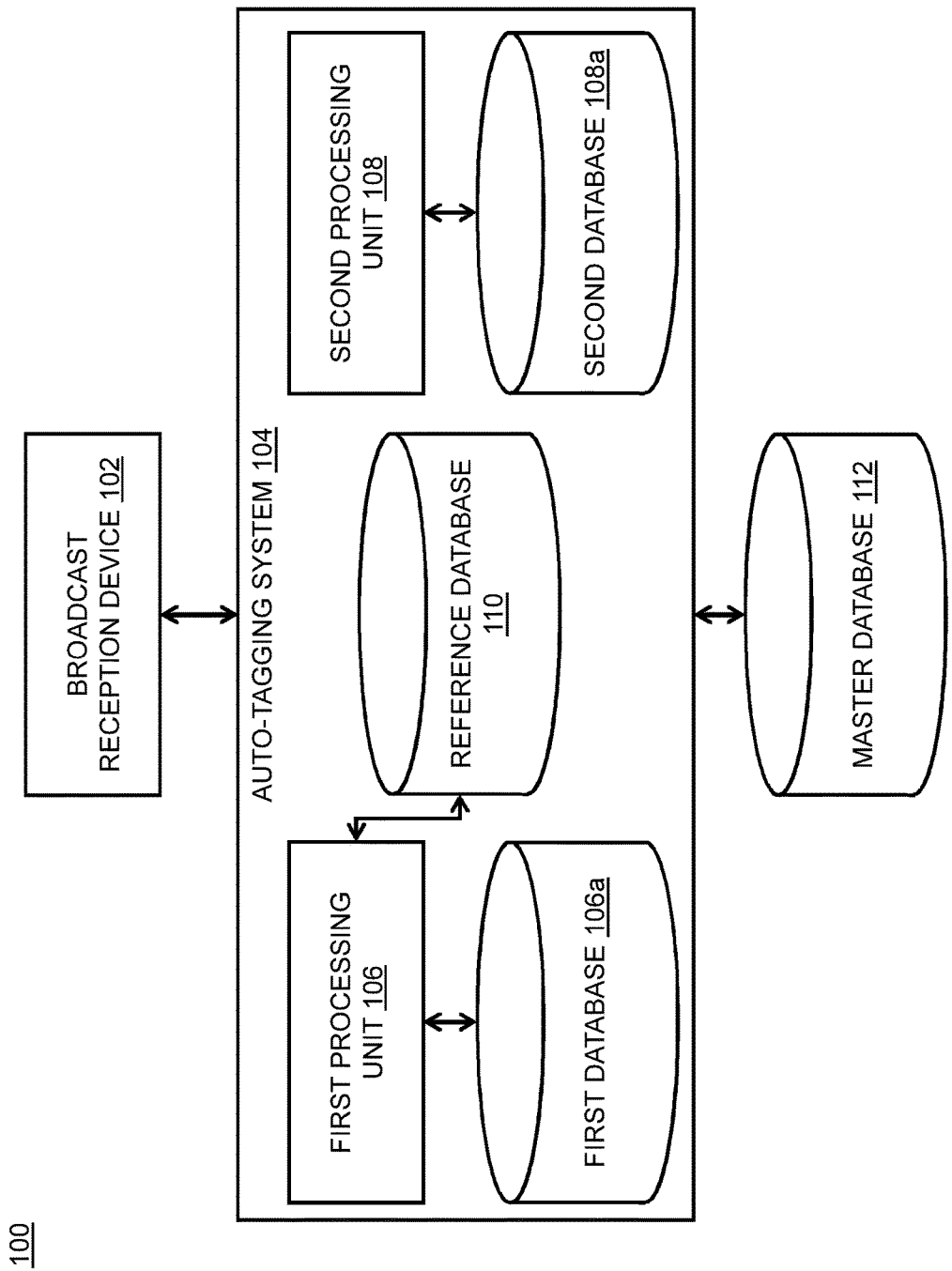
Figure 1B:
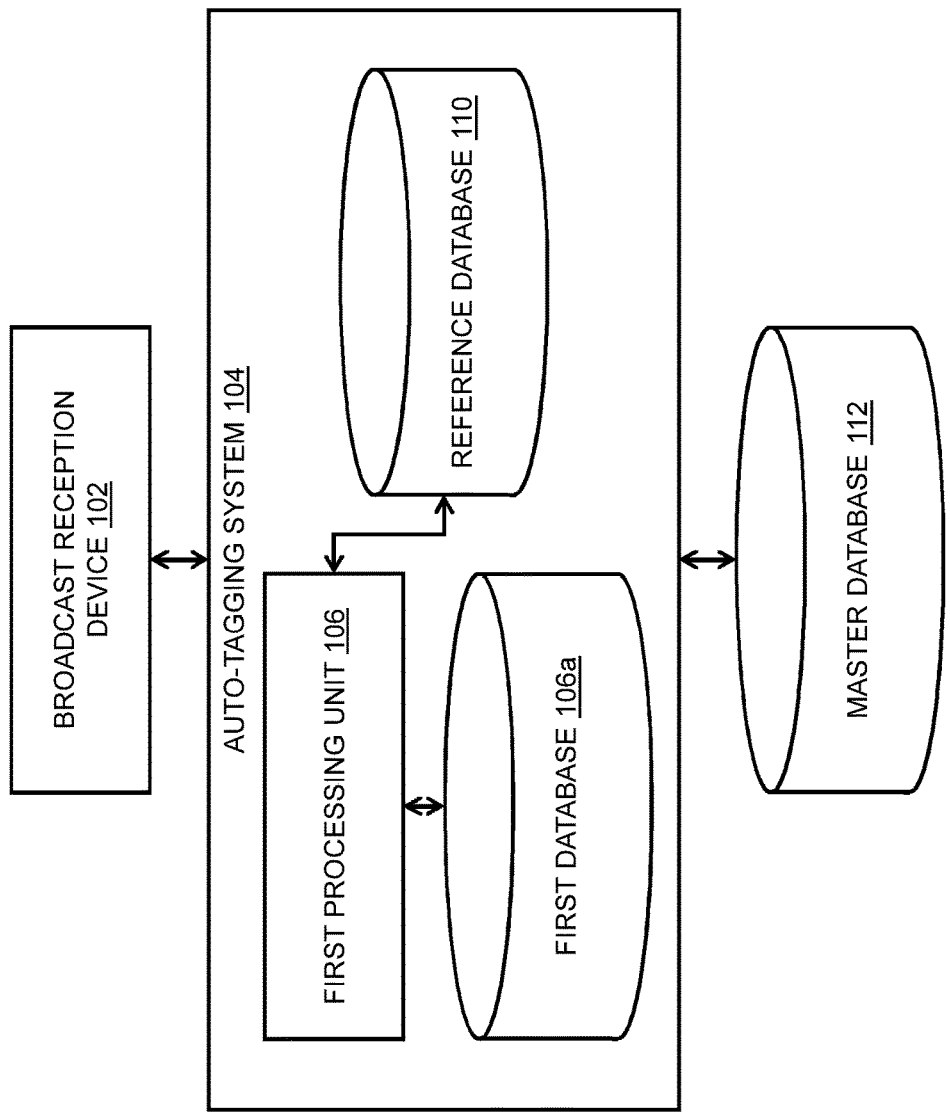
Figure 1C:
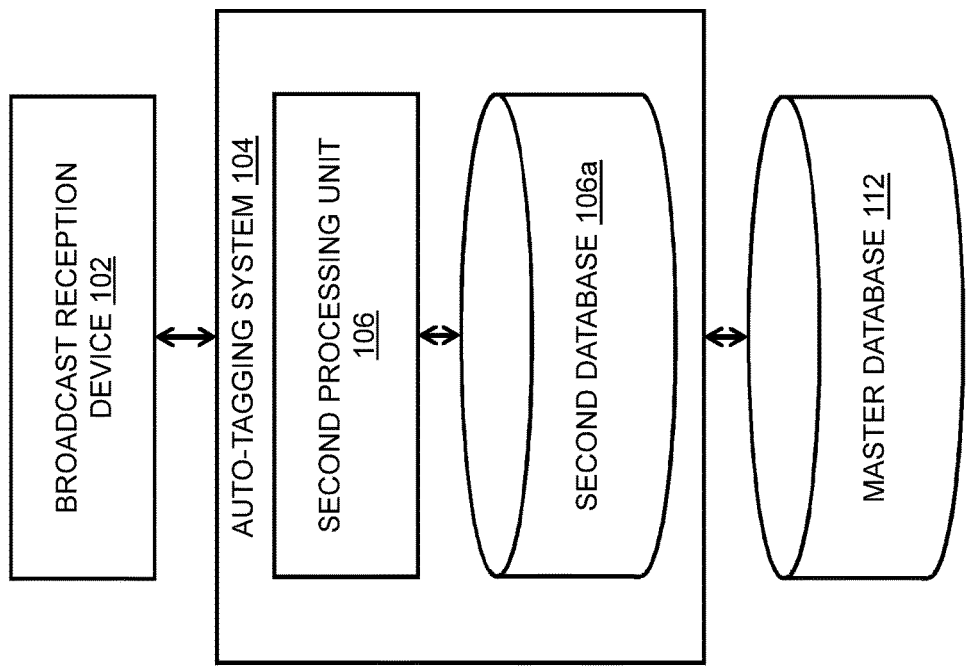
Figure 2:
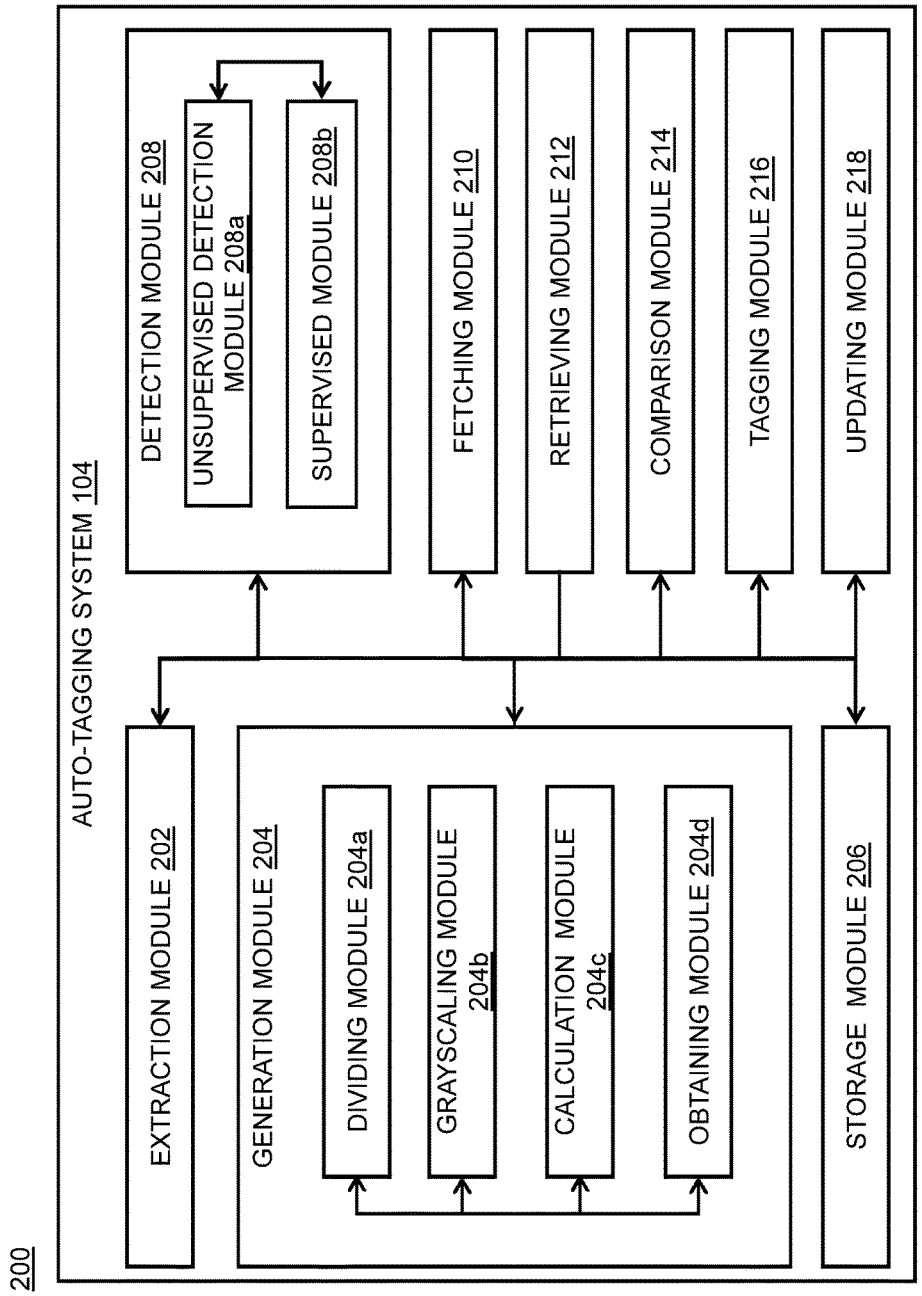
Figure 3:
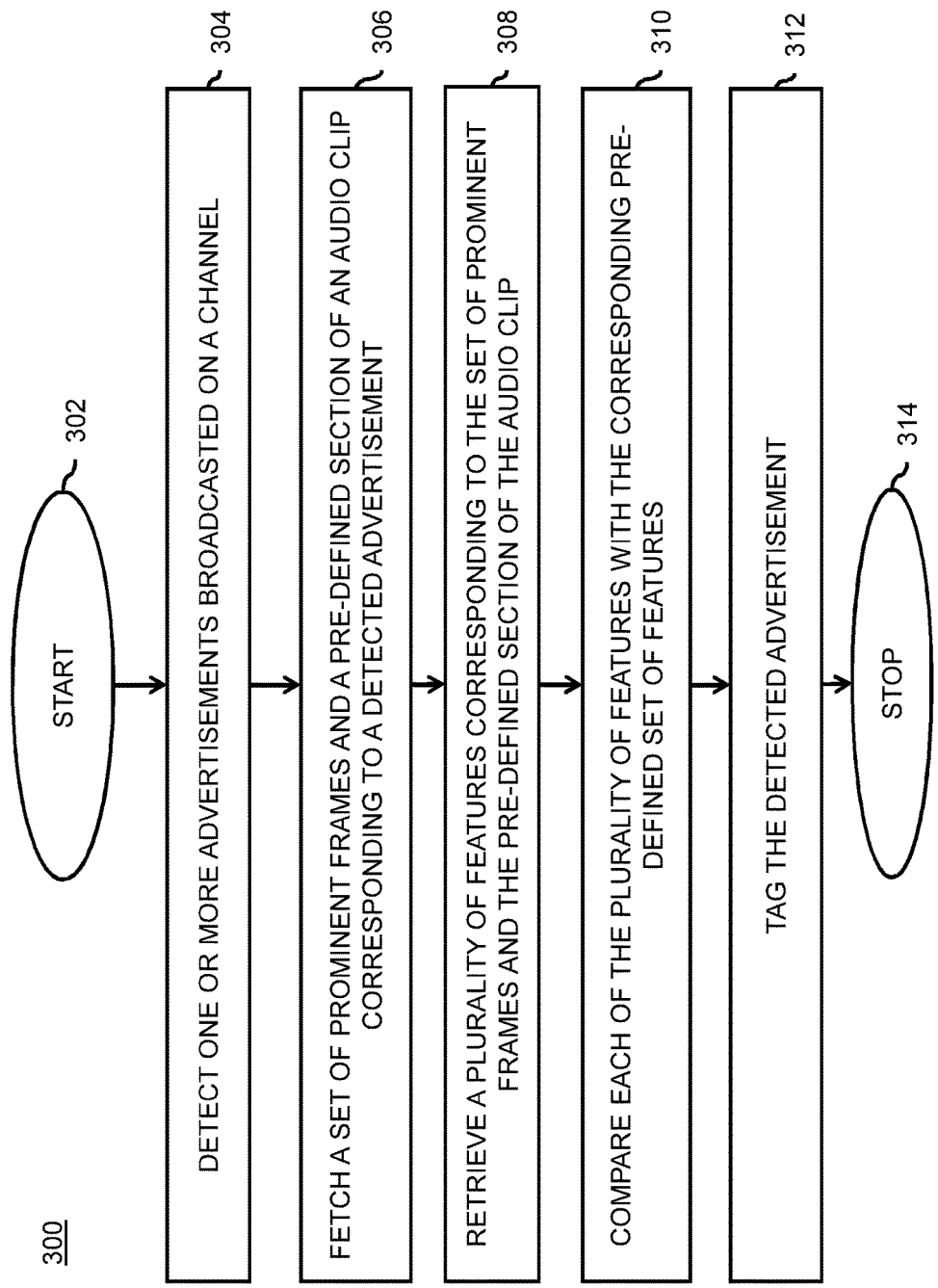
Figure 4:
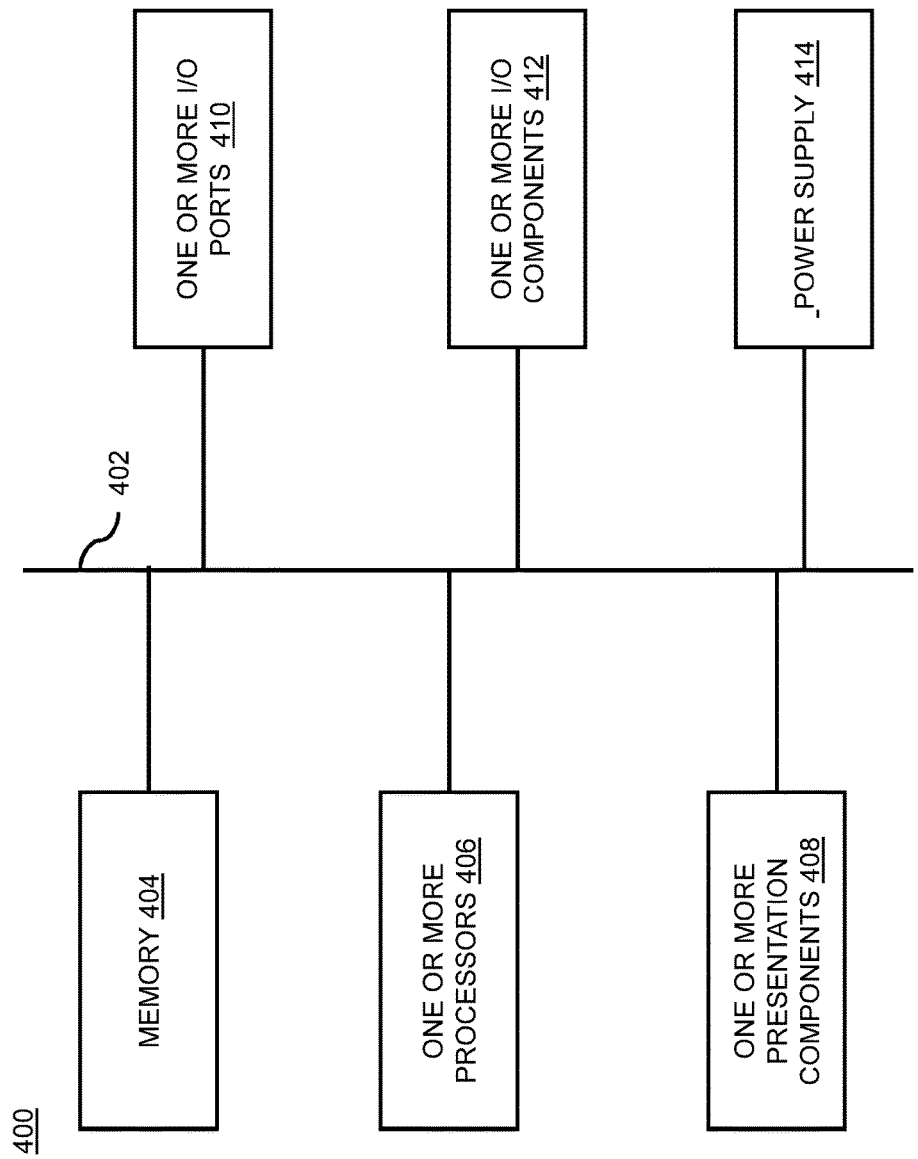

Having thus described the invention in general terms, reference will now be made to the accompanying drawings, which are not necessarily drawn to scale, and wherein:

FIG. 1A illustrates a system for an auto-tagging of one or more advertisements broadcasted on a channel, in accordance with an embodiment of the present disclosure;

FIG. 1B illustrates a system for the unsupervised detection and the auto-tagging of the one or more advertisements broadcasted on the channel, in accordance with another embodiment of the present disclosure;

FIG. 1C illustrates a system for the supervised detection of the one or more advertisements broadcasted on the channel, in accordance with yet another embodiment of the present disclosure;

FIG. 2 illustrates a block diagram of an auto-tagging system, in accordance with various embodiments of the present disclosure;

FIG. 3 illustrates a flow chart for the auto-tagging of the one or more advertisements broadcasted on the channel, in accordance with various embodiments of the present disclosure; and FIG. 4 illustrates a block diagram of a computing device, in accordance with various embodiments of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

FIG. 1A illustrates a system 100 for an unsupervised and a supervised detection of one or more advertisements broadcasted on a channel, in accordance with an embodiment of the present disclosure. The system 100 describes an environment suitable for an interactive reception and processing of a channel broadcast. The system 100 is configured to provide a setup for detection of the one or more advertisements. Moreover, the system 100 is configured to tag each of the one or more advertisements automatically with a brand name.

The system 100 includes a broadcast reception device 102, an auto-tagging system 104 and a master database 112. The above stated elements of the system 100 operate coherently and synchronously to detect the one or more advertisements present in media content broadcasted on the channel. In addition, the above stated elements of the system 100 operate coherently and synchronously to tag each of the one or more advertisements automatically.

The broadcast reception device 102 is a channel feed receiving and processing device. The broadcast reception device 102 is attached directly or indirectly to a receiving antenna or dish. The receiving antenna receives a broadcasted signal carrying one or more channel feeds. The one or more channel feeds are encoded in a pre-defined format. In addition, the one or more channel feeds have a set of characteristics. The set of characteristics includes a frame rate, an audio sample rate, one or more frequencies and the like.

The broadcasted signal carrying the one or more channel feeds is initially transmitted from a transmission device. In an embodiment of the present disclosure, the broadcasted signal carrying the one or more channel feeds is a multiplexed MPEG-2 encoded signal having a constant bit rate. In another embodiment of the present disclosure, the broadcasted signal carrying the one or more channel feeds is a multiplexed MPEG-2 encoded signal having a variable bit rate. In yet another embodiment of the present disclosure, the broadcasted signal carrying the one or more channel feeds is any digital standard encoded signal. The bit rate is based on complexity of each frame in each of the one or more channel feeds. The quality of the multiplexed MPEG-2 encoded signal will be reduced when the broadcasted signal is too complex to be coded at a constant bit-rate. The bit rate of the variable bit-rate MPEG-2 streams is adjusted dynamically as less bandwidth is needed to encode the images with a given picture quality. In addition, the broadcasted signal is encrypted for a conditional access to a particular subscriber. The encrypted broadcast signal is uniquely decoded by the broadcast reception device 102 uniquely. In an embodiment of the present disclosure, the broadcast reception device 102 receives media content corresponding to the broadcasted content having audio in the pre-defined regional language or the standard language. The media content corresponds to another channel.

In an example, a digital TV signal is received on the broadcast reception device 102 as a stream of MPEG-2 data. The MPEG-2 data has a transport stream. The transport stream has a data rate of 40 megabits/second for a cable or satellite network. Each transport stream consists of a set of sub-streams. The set of sub-streams is defined as elementary streams. Each elementary stream includes an MPEG-2 encoded audio, an MPEG-2 encoded video and data encapsulated in an MPEG-2 stream. In addition, each elementary stream includes a packet identifier (hereinafter "PID") that acts as a unique identifier for corresponding elementary stream within the transport stream. The elementary streams are split into packets in order to obtain a packetized elementary stream (hereinafter "PES").

In an embodiment of the present disclosure, the broadcast reception device 102 is a digital set top box. In another embodiment of the present disclosure, the broadcast reception device 102 is a hybrid set top box. In yet another embodiment of the present disclosure, the broadcast reception device 102 is an internet protocol television (hereinafter IPTV) set top box. In yet another embodiment of the present disclosure, the broadcast reception device 102 is any standard broadcast signal processing device. Moreover, the broadcast reception device 102 may receive the broadcast signal from any broadcast signal medium.

In an embodiment of the present disclosure, the broadcast signal medium is an ethernet cable. In another embodiment of the present disclosure, the broadcast signal medium is a satellite dish. In yet another embodiment of the present disclosure, the broadcast signal medium is a coaxial cable. In yet another embodiment of the present disclosure, the broadcast signal medium is a telephone line having DSL connection. In yet another embodiment of the present disclosure, the broadcast signal medium is a broadband over power line (hereinafter "BPL"). In yet another embodiment of the present disclosure, the broadcast signal medium is an ordinary VHF or UHF antenna.

The broadcast reception device 102 primarily includes a signal input port, an audio output port, a video output port, a de-multiplexer, a video decoder, an audio decoder and a graphics engine. The broadcast signal carrying the one or more channel feeds is received at the signal input port. The broadcast signal carrying the one or more channel feeds is de-multiplexed by the de-multiplexer. The video decoder decodes the encoded video and the audio decoder decodes the encoded audio. The video and audio corresponds to a channel selected in the broadcast reception device 102. In general, the broadcast reception device 102 carries the one or more channel feeds multiplexed to form a single transporting stream. The broadcast reception device 102 can decode only one channel in real time.

Further, the decoded audio and the decoded video are received at the audio output port and the video output port. Further, the decoded video has a first set of features. The first set of features includes a frame height, a frame width, a frame rate, a video resolution, an aspect ratio, a bit rate and the like. Moreover, the decoded audio has a second set of features. The second set of features includes a sample rate, a bit rate, a bin size, one or more data points, one or more prominent frequencies and one or more prominent amplitudes. Further, the decoded video may be of any standard quality. In an embodiment of the present disclosure, the decoded video signal is a 144p signal. In another embodiment of the present disclosure, the decoded video signal is a 240p signal. In yet another embodiment of the present disclosure, the decoded video signal is a 360p signal. In yet another embodiment of the present disclosure, the decoded video signal is a 480p signal. In yet another embodiment of the present disclosure, the decoded video signal is a 720p video signal. In yet another embodiment of the present disclosure, the decoded video signal is a 1080p video signal. In yet another embodiment of the present disclosure, the decoded video signal is a 1080i video signal. In yet another embodiment of the present disclosure, the decoded video signal is a 1440p video signal. In yet another embodiment of the present disclosure, the decoded video signal is a 2160p video signal. Here, p and i denotes progressive scan and interlace scan techniques.

Further, the decoded video and the decoded audio (hereinafter "media content") are transferred to the auto-tagging system 104 through a transfer medium. The transfer medium can be a wireless medium or a wired medium. Moreover, the media content includes one or more television programs, the one or more advertisements, one or more channel related data, subscription related data, operator messages and the like. The media content has a pre-defined frame rate, a pre-defined number of frames and a pre-defined bit rate for a pre-defined interval of broadcast. In an embodiment of the present disclosure, the media content broadcasted on the channel uses a pre-defined regional language in the audio. In another embodiment of the present disclosure, the media content broadcasted on the channel uses a standard language accepted nationally. Moreover, the auto-tagging system 104 includes a first processing unit 106 and a second processing unit 108. The auto-tagging system 104 has a built in media splitter configured to copy and transmit the media content synchronously to the first processing unit 106 and the second processing unit 108 in the real time. The first processing unit 106 includes a first central processing unit and associated peripherals for unsupervised detection of the one or more advertisements (as shown in FIG. 1B). The first processing unit 106 is connected to a first database 106*a*.

The first processing unit 106 is programmed to perform extraction of a first set of audio fingerprints and a first set of video fingerprints corresponding to the media content broadcasted on the channel. The first set of video fingerprints and the first set of audio fingerprints are extracted sequentially in the real time. The extraction of the first set of video fingerprints is done by sequentially extracting one or more prominent fingerprints corresponding to one or more prominent frames present in the media content. The one or more prominent frames correspond to the pre-defined interval of broadcast.

For example, let the media content be related to a channel say, A. The channel A broadcasts a 1 hour reality show between 9 PM to 10 PM. Suppose the media content is broadcasted on the channel A with a frame rate of 25 frames per second (hereinafter "fps"). Again let us assume that the channel A administrator has placed 10 advertisements in between 1 hour broadcast of the reality show. The first processing unit 106 separates audio and video from the media content corresponding to the reality show in the real time. Further, the first processing unit 106 sets a pre-defined range of time to approximate duration of play of every advertisement. Let us suppose the pre-defined range of time is between 12 seconds to 38 seconds. The first processing unit 106 processes each frame of the pre-defined number of frames of the 1 hour long reality show. The first processing unit 106 filters and selects prominent frames having dissimilar scenes. The first processing unit 106 extracts relevant characteristics corresponding to each prominent frame. The relevant characteristics constitute a digital video fingerprint. Similarly, the first processing unit 106 extracts the first set of audio fingerprints corresponding to the media content.

Furthermore, each of the one or more prominent fingerprints corresponds to a prominent frame having sufficient contrasting features compared to an adjacent prominent frame. For example, let us suppose that the first processing unit 106 select 5 prominent frames per second from 25 frames per second. Each pair of adjacent frames of the 5 prominent frames will have evident contrasting features. The first processing unit 106 generates a set of digital signature values corresponding to an extracted set of video fingerprints. The first processing unit 106 generates each digital signature value of the set of digital signature values by dividing each prominent frame of the one or more prominent frames into a pre-defined number of blocks. In an embodiment of the present disclosure, the predefined number of block is 16 (4×4). In another embodiment of the present disclosure, the pre-defined number of blocks is any suitable number. Each block of the pre-defined number of blocks has a pre-defined number of pixels. Each pixel is fundamentally a combination of red (hereinafter "R"), green (hereinafter "G") and blue (hereinafter "B") colors. The colors are collectively referred to as RGB. Each color of a pixel (RGB) has a pre-defined value in a pre-defined range of values. The predefined range of values is 0-255.

In an example, the RGB for the pixel has a value of 000000. The color of pixel is black. In another example, the RGB for the pixel has a value of FFFFFF (255; 255; 255). The color of the pixel is white. Here, FF is hexadecimal equivalent of decimal, 255. In yet another example, the RGB for the pixel has a value of FF0000 (255, 0, 0). The color of the pixel is red. In yet another example, the RGB for the pixel has a value of 0000FF (0, 0, 255). The color of the pixel is blue. In yet another example, the RGB for the pixel has a value of 008000 (0, 128, 0). The color of the pixel is green.

The first processing unit 106 gray-scales each block of each prominent frame of the one or more prominent frames. The gray-scaling of each block is a conversion of RGB to monochromatic shades of grey color. Here 0 represents black and 255 represents white. Further, the first processing unit 106 calculates a first bit value and a second bit value for each block of the prominent frame. The first bit value and the second bit value are calculated from comparing a mean and a variance for the pre-defined number of pixels in each block of the prominent frame with a corresponding mean and variance for a master frame in the master database 112. The first processing unit 106 assigns the first bit value and the second bit with a binary 0 when the mean and the variance for each block of the prominent frame is less the corresponding mean and variance of each master frame. The first processing unit 106 assigns the first bit value and the second bit value with a binary 1 when the mean and the variance for each block is greater than the corresponding mean and variance of each master frame.

Furthermore, the first processing unit 106 obtains a 32 bit digital signature value corresponding to each prominent frame. The 32 bit digital signature value is obtained by sequentially arranging the first bit value and the second bit value for each block of the pre-defined number of blocks of the prominent frame. The first processing unit 106 stores each digital signature value corresponding to each prominent frame of the one or more prominent frames in the first database 106a. The digital signature value corresponds to the one or more programs and the one or more advertisements. The first processing unit 106 utilizes a temporal recurrence algorithm to detect the one or more advertisements. In temporal recurrence algorithm, the first processing unit 106 probabilistically matches a first pre-defined number of digital signature values with a stored set of digital signature values present in the first database 106a.

In an example, let us suppose that the first processing unit 106 generates 100 digital signature values corresponding to 100 prominent frames in the first database 106a. The first processing unit 106 probabilistically matches 20 digital signature values corresponding to $101^{st}$ to $121^{st}$ prominent frame with each 20 digital signature values corresponding to 100 previously stored prominent frames.

The probabilistic match of the first pre-defined number of digital signature values sequentially for each of the prominent frame is performed by utilizing a sliding window algorithm. In an embodiment of the present disclosure, the first pre-defined number of digital signature values of the set of digital signature values for the unsupervised detection of the one or more advertisements is 20. The first processing unit 106 determines a positive probabilistic match of the pre-defined number of prominent frames based on a pre-defined condition. The pre-defined condition includes a pre-defined range of positive matches corresponding to probabilistically match digital signature values and a pre-defined duration of media content corresponding to the positive match. In addition, the pre-defined condition includes a sequence and an order of the positive matches and a degree of match of a pre-defined range of number of bits of the first pre-defined number of signature values. In an embodiment of the present disclosure, the pre-defined range of probabilistic matches corresponding to the positive match lies in a range of 40 matches to 300 matches. In another embodiment of the present disclosure, the pre-defined range of probabilistic matches corresponding to the positive match lies in a suitable duration of each advertisement running time. In an embodiment of the present disclosure, the first processing unit 106 discards the probabilistic matches corresponding to less than 40 positive matches.

Further, the pre-defined duration of media content corresponding to the positive match has a first limiting duration bounded by a second limiting duration. In an embodiment of the present disclosure, the first limiting duration is 10 seconds and the second limiting duration is 25 seconds. In another embodiment of the present disclosure, the first limiting duration is 10 seconds and the second limiting duration is 35 seconds. In yet another embodiment of the present disclosure, the first limiting duration is 10 seconds and the second limiting duration is 60 seconds. In yet another embodiment of the present disclosure, the first limiting duration is 10 seconds and the second limiting duration is 90 seconds. In yet another embodiment of the present disclosure, the first limiting duration and the second limiting duration may have any suitable limiting durations.

In an example, suppose 100 digital signature values from $1000^{th}$ prominent frame to $1100^{th}$ prominent frame gives a positive match with a stored $100^{th}$ frame to $200^{th}$ frame in the first database 106a. The first processing unit 106 checks whether the number of positive matches is in the pre-defined range of positive matches. In addition, the first processing unit 106 checks whether the positive matches correspond to media content is in the first limiting duration and the second limiting duration. Moreover, the first processing unit 106 checks whether the positive matches of 100 digital signature values for unsupervised detection of the one or more advertisements is in a required sequence and order.

The first processing unit 106 checks for the degree of match of the pre-defined range of number of bits of the first pre-defined number of signature values. In an example, the degree of match of 640 bits (32 Bits×20 digital signature values) of the generated set of digital signature values with stored 640 digital signature values is 620 bits. In such case, the first processing unit 106 flags the probabilistic match as the positive match. In another example, the degree of match of 640 bits of the generated set of digital signature values with stored 640 digital signature values is 550 bits. In such case, the first processing unit 106 flags the probabilistic match as the negative match. In an embodiment of the present disclosure, the pre-defined range of number of bits is 0-40.

The first processing unit 106 generates one or more prominent frequencies and one or more prominent amplitudes from extracted first set of audio fingerprints. The first processing unit 106 fetches a sample rate of first set of audio fingerprints. The sample rate is divided by a pre-defined bin size set for the audio. The division of the sample rate by the pre-defined bin size provides the data point. Further, the first processing unit 106 performs fast fourier transform (hereinafter "FFT") on each bin size of the audio to obtain the one or more prominent frequencies and the one or more prominent amplitudes. The first processing unit 106 compares the one or more prominent frequencies and the one or more prominent amplitudes with a stored one or more prominent frequencies and a stored one or more prominent amplitudes.

Going further, the first processing unit 106 fetches the corresponding video and audio clip associated to the probabilistically matched digital signature values. The first database 106a and the first processing unit 106 are associated with an auto-tagging system 104. Furthermore, the auto-tagging system 104 retrieves a plurality of features associated with the video clip and the audio clip of the corresponding advertisement. Further, the auto-tagging system 104 compares the plurality of features with a pre-defined set of features. In an embodiment of the present disclosure, the pre-defined set of features are stored in a reference database 110.

In an embodiment of the present disclosure, the plurality of features include a brand logo displayed in one or more prominent frames of the set of prominent frames. In another embodiment of the present disclosure, the plurality of features include a brand tagline displayed in the one or more prominent frames of the set of prominent frames. In yet another embodiment of the present disclosure, the plurality of features include a brand tagline recited corresponding to the pre-defined section of the audio clip. Moreover, the auto-tagging system 104 decides whether the audio clip and the video clip correspond to a new advertisement. Further, the auto-tagging system 104 tags each audio clip and the video clip with a unique tag. In an embodiment of the present disclosure, the unique tag is a brand name associated with a detected advertisement.

In an embodiment of the present disclosure, the auto-tagging system 104 tags each audio clip through a brand tagline identification in the real time. In an example of a product B, while advertising, an actor recites a unique tagline of the product B. The auto-tagging system 104 automatically converts the unique tagline of the product B recited by the actor into the corresponding text by a speech-to-text analysis. The auto-tagging system 104 compares the text associated with the unique tagline of the product B with the pre-defined taglines present in the reference database 110. The auto-tagging system 104 tags the advertisement with the corresponding brand name of the product B.

In an embodiment of the present disclosure, the auto-tagging system 104 tags each video clip through a brand logo identification in the real time. In another embodiment of the present disclosure, the auto-tagging system 104 tags each video clip through a brand tagline identification in the real time. In yet another embodiment of the present disclosure, the auto-tagging system 104 tags each video clip through any suitable brand element identification in the real time.

In an example of an advertisement of a product C, the brand logo is displayed during the streaming of the advertisement associated with the product C in the real time. The auto-tagging system 104 retrieves the one or more prominent frames containing the brand logo associated with the product C. In addition, the auto-tagging system 104 compares the brand logo of the product C with a plurality of brand logo stored in the reference database 110. Moreover, the auto-tagging system 104 tags the advertisement with the corresponding brand name of the product C. In another example of the advertisement of product D, the brand tagline is displayed in the video clip of the advertisement associated with the product D in the real time. The auto-tagging system 104 fetches the one or more prominent frames containing the brand tagline associated with the advertisement of the product D. Furthermore, the auto-tagging system 104 retrieves the brand tagline associated with the product D and co-relates the brand tagline of the product D with a plurality of brand taglines stored in the reference database 110. Moreover, the auto-tagging system 104 tags the advertisement with the corresponding brand name of the product D.

In an embodiment of the present disclosure, the first processing unit 106 extracts the first set of audio fingerprints and the first set of video fingerprints corresponding to another channel. The first processing unit 106 extracts the pre-defined number of prominent frames and generates pre-defined number of digital signature values. The first processing unit 106 performs the temporal recurrence algorithm to detect a new advertisement. In an embodiment of the present disclosure, the first processing unit 106 generates prominent frequencies and prominent amplitudes of the audio. In another embodiment of the present disclosure, the first processing unit 106 discards the audio from the media content. In an embodiment of the present disclosure, the first processing unit 106 probabilistically matches the one or more prominent frequencies and the one or more prominent amplitudes with stored prominent frequencies and stored prominent amplitudes in the first database. The stored prominent frequencies and the stored prominent amplitudes correspond to a regional channel having audio in the pre-defined regional language or standard language. In an embodiment of the present disclosure, the standard language is English. In another embodiment of the present disclosure, the first processing unit 106 gives precedence to results of probabilistic match of video fingerprints than to the audio fingerprints. Moreover, the auto-tagging system 104 automatically tags the detected advertisement broadcasted in the pre-defined regional language or the standard language.

Further, the auto-tagging system 104 stores the plurality of digital fingerprints of the advertisement for determining one or more advertisements associated with a corresponding product. In an example, a product E may have one or more advertisements. Each of the one or more advertisement associated with the product E may have different duration and fingerprints. The auto-tagging system 104 compares the stored fingerprints of each advertisement of the product E. In addition, the auto-tagging system 104 determines the difference in the fingerprints associated with each advertisements of the product E. Simultaneously, the auto-tagging system 104 compares the brand logo and the brand tagline of the product E with the brand logo and the brand tagline stored in the reference database 110. The auto-tagging system 104 treats the advertisements as the new advertisement of the product E after obtaining positive match results.

Going further, the first processing unit 106 reports a positively matched digital signature values corresponding to each detected advertisement in a reporting database present in the first database 106a. The first processing unit 106 discards any detected advertisement already reported in the reporting database.

The second processing unit 108 includes a second central processing unit and associated peripherals for supervised detection of the one or more advertisements (also shown in FIG. 1C). The second processing unit 106 is connected to a second database 108a. The second processing unit 108 is programmed to perform the extraction of the first set of audio fingerprints and the first set of video fingerprints corresponding to the media content broadcasted on the channel. The first set of video fingerprints and the first set of audio fingerprints are extracted sequentially in the real time. The extraction of the first set of video fingerprints is done by sequentially extracting the one or more prominent fingerprints corresponding to the one or more prominent frames for the pre-defined interval of broadcast.

Furthermore, each of the one or more prominent fingerprints corresponds to the prominent frame having sufficient contrasting features compared to the adjacent prominent frame. For example, let us suppose that the second processing unit 108 selects 6 prominent frames per second from 25 frames per second. Each pair of adjacent frames of the 6 prominent frames will have evident contrasting features. The second processing unit 108 generates the set of digital signature values corresponding to the extracted set of video fingerprints. The second processing unit 108 generates each digital signature value of the set of digital signature values by dividing each prominent frame of the one or more prominent frames into the pre-defined number of blocks. In an embodiment of the present disclosure, the predefined number of block is 15 (4×4). In another embodiment of the present disclosure, the pre-defined number of blocks is any suitable number. Each block of the pre-defined number of blocks has the pre-defined number of pixels. Each pixel is fundamentally the combination of R, G and B colors. The colors are collectively referred to as RGB. Each color of the pixel (RGB) has the pre-defined value in the pre-defined range of values. The predefined range of values is 0-255.

The second processing unit 108 gray-scales each block of each prominent frame of the one or more prominent frames. The second processing unit 108 calculates the first bit value and the second bit value for each block of the prominent frame. The first bit value and the second bit value are calculated from comparison of the mean and the variance for the pre-defined number of pixels with the corresponding mean and variance for the master frame. The master frame is present in the master database 112. The second processing unit 108 assigns the first bit value and the second bit with the binary 0 when the mean and the variance for each block is less the corresponding mean and variance of each master frame. The second processing unit 108 assigns the first bit value and the second bit value with the binary 1 when the mean and the variance for each block is greater than the corresponding mean and variance of each master frame.

The second processing unit 108 obtains the 32 bit digital signature value corresponding to each prominent frame. The 32 bit digital signature value is obtained by sequentially arranging the first bit value and the second bit value for each block of the pre-defined number of blocks of the prominent frame. The second processing unit 108 stores each digital signature value corresponding to each prominent frame of the one or more prominent frames in the second database 108a. The digital signature value corresponds to the one or more programs and the one or more advertisements.

The second processing unit 108 performs the supervised detection of the one or more advertisements. The second processing unit 108 probabilistically matches a second pre-defined number of digital signature values with the stored set of digital signature values present in the master database 112. The second pre-defined number of digital signature values corresponds to the second pre-defined number of prominent frames of the real time broadcasted media content. The probabilistic match is performed for the set of digital signature values by utilizing a sliding window algorithm. The second processing unit 108 determines the positive match in the probabilistically matching of the second pre-defined number of digital signature values with the stored set of digital signature values. The stored set of digital signature values is present in the master database 112. In an embodiment of the present disclosure, the second pre-defined number of digital signature values of the set of digital signature values for the supervised detection of the one or more advertisements is 6. In another embodiment of the present disclosure, the second pre-defined number of digital signature values is selected based on optimal processing capacity and performance of the second processing unit 108.

In an example, let us suppose that the second processing unit 108 stores 300 digital signature values corresponding to 300 prominent frames in the second database 108a for 10 seconds of the media content. The second processing unit 108 probabilistically matches 6 digital signature values corresponding to $101^{st}$ to $107^{nth}$ prominent frame with each 6 digital signature values corresponding to 300 previously stored prominent frames. The 300 previously stored prominent frames are present in the master database 112.

In another example, suppose 300 digital signature values from 500 prominent frame to $800^{th}$ prominent frame gives a positive match with a stored $150^{th}$ frame to $450^{th}$ frame in the master database 112. The second processing unit 108 checks whether the number of positive matches is in the pre-defined range of positive matches and the positive matches correspond to media content in the first limiting duration and the second limiting duration. In addition, the second processing unit 108 checks whether the positive matches of 300 digital signature values for supervised detection of the one or more advertisements is in the required sequence and order.

The second processing unit 108 checks for the degree of match of the pre-defined range of number of bits of the second pre-defined number of signature values. In an example, the degree of match of 192 bits of the generated set of digital signature values with stored 192 digital signature values is 185 bits. In such case, the second processing unit 108 flags the probabilistic match as the positive match. In another example, the degree of match of 192 bits of the generated set of digital signature values with stored 192 digital signature values is 179 bits. In such case, the second processing unit 108 flags the probabilistic match as the negative match. In an embodiment of the present disclosure, the pre-defined range of number of bits is 0-12.

The second processing unit 108 compares the one or more prominent frequencies and the one or more prominent amplitudes with the stored one or more prominent frequencies and the stored one or more prominent amplitudes. The one or more prominent frequencies and the one or more prominent amplitudes corresponding to the extracted first set of audio fingerprints. In an embodiment of the present disclosure, the auto-tagging system 104 automatically checks whether each supervised advertisement detected is an advertisement or a program. In an embodiment of the present disclosure, the auto-tagging system 104 reports a frequency of each advertisement broadcasted for a first time and a frequency of each advertisement broadcasted repetitively.

Further, the master database 112 is present in a master server. The master database 112 includes a plurality of digital video and audio fingerprint records and every signature value corresponding to each previously detected and newly detected advertisement. The master database 112 is connected to the auto-tagging system 104. In an embodiment of the present disclosure, the master server is present in a remote location. In another embodiment of the present disclosure, the master server is present locally with the auto-tagging system 104.

In an embodiment of the present disclosure, the second processing unit 108 extracts the first set of audio fingerprints and the first set of video fingerprints corresponding to another channel. The second processing unit 108 extracts the pre-defined number of prominent frames and generates pre-defined number of digital signature values. The second processing unit 108 performs probabilistic matching of digital signature values corresponding to the video with the stored digital signature values in the master database detect a repeated advertisement. In an embodiment of the present disclosure, the second processing unit 108 generates the one or more prominent frequencies and the one or more prominent amplitudes of the audio. In another embodiment of the present disclosure, the second processing unit 108 discards the audio from the media content. In an embodiment of the present disclosure, the master database 112 includes the one or more advertisements corresponding to a same advertisement in every regional language. In another embodiment of the present disclosure, the master database 112 includes the advertisement in a specific national language. In embodiment of the present disclosure, the second processing unit 108 probabilistically matches the one or more prominent frequencies and the one or more prominent amplitudes with stored prominent frequencies and stored prominent amplitudes. The stored prominent frequencies and the stored prominent amplitudes correspond to a regional channel having audio in the pre-defined regional language or standard language in the master database 112. In an embodiment of the present disclosure, the standard language is English. In another embodiment of the present disclosure, the second processing unit 108 gives precedence to results of probabilistic match of video fingerprints than to the audio fingerprints.

Further, the auto-tagging system 104 stores the generated set of digital signature values, the first set of audio fingerprints and the first set of video fingerprints in the first database 106a and the second database 108a. Furthermore, the auto-tagging system 104 updates the first metadata manually in the master database 112 for the unsupervised detection of the one or more advertisements. The first metadata includes the set of digital signature values and the first set of video fingerprints.

It may be noted that in FIG. 1A, FIG. 1B and FIG. 1C, the system 100 includes the broadcast reception device 102 for decoding one channel; however, those skilled in the art would appreciate the system 100 includes more number of broadcast reception devices for decoding more number of channels. It may be noted that in FIG. 1A, FIG. 1B and FIG. 1C, the system 100 includes the auto-tagging system 104 for the supervised and the unsupervised detection of the one or more advertisement corresponding to one channel; however, those skilled in the art would appreciate that the auto-tagging system 104 detects the one or more advertisements corresponding to more number of channels.

FIG. 2 illustrates a block diagram 200 of the auto-tagging system 104, in accordance with various embodiments of the present disclosure. The block diagram 200 describes the auto-tagging system 104 configured for the unsupervised and the supervised detection of the one or more advertisements.

The block diagram 200 of the auto-tagging system 104 includes an extraction module 202, a generation module 204, a storage module 206, a detection module 208, a fetching module 210 and a retrieving module 212. In addition, the auto-tagging system 104 includes a comparison module 214, a tagging module and an updating module 214. The extraction module 202 extracts the first set of audio fingerprints and the first set of video fingerprints corresponding to the media content broadcasted on the channel. The first set of audio fingerprints and the first set of video fingerprints are extracted sequentially in the real time (as described above in detailed description of FIG. 1A, FIG. 1B and FIG. 1C).

Further, the generation module 204 generates the set of digital signature values corresponding to the extracted set of video fingerprints. The generation module 204 generates each digital signature value of the set of digital signature values by dividing and grayscaling each prominent frame into the pre-defined number of blocks. Further, the generation module 204 calculates and obtains each digital signature value corresponding to each block of the prominent frame (as discussed above in the detailed description of FIG. 1A, FIG. 1B and FIG. 1C). The generation module 204 includes a dividing module 204a, a grayscaling module 204b, a calculation module 204c and an obtaining module 204d. The dividing module 204a divides each prominent frame of the one or more prominent frames into the pre-defined number of blocks (as discussed above in the detailed description of FIG. 1A). The grayscaling module 204b grayscales each block of each prominent frame of the one or more prominent frames. The calculation module 204c calculates the first bit value and the second bit value for each block of the prominent frame (as described above in the detailed description of FIG. 1A). The obtaining module 204d obtains the 32 bit digital signature value corresponding to each prominent frame (as described above in detailed description of FIG. 1A, FIG. 1B and FIG. 1C).

The storage module 206 stores the generated set of digital signature values, the first set of audio fingerprints and the first set of video fingerprints in the first database 106a and the second database 108a (as described above in detailed description of FIG. 1A, FIG. 1B and FIG. 1C). Further, the detection module 208 detects the one or more advertisements broadcasted on the channel. The detection module 208 includes an unsupervised detection module 208a and the supervised detection module 208b. The unsupervised detection module 208a detects the new advertisement through unsupervised machine learning (as discussed in the detailed description of FIG. 1A, FIG. 1B and FIG. 1C). Moreover, the supervised detection module 208b detects the advertisements broadcasted previously during the broadcasting of the media content (as described above in the detailed description of FIG. 1A, FIG. 1B and FIG. 1C).

The fetching module 210 fetches the set of prominent frames and the pre-defined section of the audio clip. The set of prominent frames and the pre-defined section of the audio clip corresponds to the detected advertisement (as discussed above in the detailed description of FIG. 1A, FIG. 1B and FIG. 1C). Further, the retrieving module 212 retrieves the plurality of features. The plurality of features corresponds to the set of prominent frames and the pre-defined section of the audio clip (as discussed above in the detailed description of FIG. 1A, FIG. 1B and FIG. 1C).

Going further, the comparison module 214 compares each of the plurality of features with the corresponding pre-defined set of features. In addition, the pre-defined set of features are stored in the reference database (as described above in the detailed description of FIG. 1A, FIG. 1B and FIG. 1C). Further, the tagging module 216 tags the detected advertisement with the unique tag. The unique tag is the brand name associated with the detected advertisement (as discussed above in the detailed description of FIG. 1A, FIG. 1B and FIG. 1C). Furthermore, the updating module 218 updates the first metadata manually in the master database 112 for the unsupervised detection of the one or more advertisements. The first metadata includes the set of digital signature values and the first set of video fingerprints corresponding to the detected advertisement (as described in the detailed description of FIG. 1A).

FIG. 3 illustrates a flow chart 300 for auto-tagging the one or more advertisements broadcasted on the channel, in accordance with various embodiments of the present disclosure. It may be noted that to explain the process steps of the flowchart 300, references will be made to the interactive messaging system elements of the FIG. 1A, FIG. 1B, FIG. 1C and FIG. 2.

The flowchart 300 initiates at step 302. At step 304, the detection module 208 detects the one or more advertisements broadcasted on the channel. At step 306, the fetching module 210 fetches the set of prominent frames and the pre-defined section of an audio clip corresponding to the detected advertisement. At step 308, the retrieving module 212 retrieves the plurality of features corresponding to the set of prominent frames and the pre-defined section of the audio clip. At step 310, the comparison module 214 compares each of the plurality of features with the corresponding pre-defined set of features. At step 312, the tagging module 216 tags the detected advertisement. The flow chart 300 terminates at step 314.

It may be noted that the flowchart 300 is explained to have above stated process steps; however, those skilled in the art would appreciate that the flowchart 300 may have more/less number of process steps which may enable all the above stated embodiments of the present disclosure.

FIG. 4 illustrates a block diagram of a computing device 400, in accordance with various embodiments of the present disclosure. The computing device 400 includes a bus 402 that directly or indirectly couples the following devices: memory 404, one or more processors 406, one or more presentation components 408, one or more input/output (I/O) ports 410, one or more input/output components 412, and an illustrative power supply 414. The bus 402 represents what may be one or more buses (such as an address bus, data bus, or combination thereof). Although the various blocks of FIG. 4 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 4 is merely illustrative of an exemplary computing device 400 that can be used in connection with one or more embodiments of the present invention. Distinction is not made between such categories as "workstation," "server," "laptop," "hand-held device," etc., as all are contemplated within the scope of FIG. 4 and reference to "computing device."

The computing device 400 typically includes a variety of computer-readable media. The computer-readable media can be any available media that can be accessed by the computing device 400 and includes both volatile and non-volatile media, removable and non-removable media. By way of example, and not limitation, the computer-readable media may comprise computer storage media and communication media. The computer storage media includes volatile and nonvolatile, removable and non-removable media implemented in any method or technology for storage of information such as computer-readable instructions, data structures, program modules or other data. The computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 400. The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 404 includes computer-storage media in the form of volatile and/or nonvolatile memory. The memory 404 may be removable, non-removable, or a combination thereof. Exemplary hardware devices include solid-state memory, hard drives, optical-disc drives, etc. The computing device 400 includes one or more processors that read data from various entities such as memory 404 or I/O components 412. The one or more presentation components 408 present data indications to a user or other device. Exemplary presentation components include a display device, speaker, printing component, vibrating component, etc. The one or more I/O ports 410 allow the computing device 400 to be logically coupled to other devices including the one or more I/O components 412, some of which may be built in. Illustrative components include a microphone, joystick, game pad, satellite dish, scanner, printer, wireless device, etc.

The present disclosure has numerous disadvantages over the prior art. The present disclosure provides a novel method to detect any new advertisement running for the first time on any television channel. The advertisements are detected robustly and dedicated supervised and unsupervised central processing unit (hereinafter "CPU") are installed. Further, the present disclosure provides a method and system that is economic and provides high return of investment. The detection of each repeated advertisement on supervised CPU and each new advertisement on unsupervised CPU significantly saves processing power and saves significant time. The disclosure provides a cost efficient solution to a scaled mapping and database for advertisement broadcast.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed is:

1. A computer-implemented method for automated tagging of one or more advertisements broadcasted on a channel in real time, the computer-implemented method comprising:
   detecting, at an auto-tagging system with a processor, the one or more advertisements broadcasted on the channel, wherein the one or more advertisements being detected based on at least one of a supervised detection and an unsupervised detection, wherein the detecting is done by generating a set of digital signature values corresponding to a first set of video fingerprints, wherein the generation of each digital signature value of the set of digital signature values is done by:
   dividing each prominent frame of one or more prominent frames into a pre-defined number of blocks, wherein each block of the pre-defined number of blocks having a pre-defined number of pixels;
   grayscaling each block of each prominent frame of the one or more prominent frames;
   calculating a first bit value and a second bit value for each block of the prominent frame, wherein the first bit value and the second bit value are calculated from comparing a mean and a variance for the pre-defined number of pixels in each block of the prominent frame with a corresponding mean and variance for a master frame in a master database, wherein the first bit value and the second bit value are assigned a binary 0 when the mean and the variance for each block of the prominent frame are less than the corresponding mean and variance of each master frame and wherein the first bit value and the second bit value are assigned a binary 1 when the mean and the variance for each block of the prominent frame are greater than the corresponding mean and variance of each master frame; and
   obtaining a 32 bit digital signature value corresponding to each prominent frame, wherein the 32 bit digital signature value is obtained by sequentially arranging the first bit value and the second bit value for each block of the pre-defined number of blocks of the prominent frame;
   fetching, at the auto-tagging system with the processor, a set of prominent frames and a pre-defined section of an audio clip corresponding to a detected advertisement;
   retrieving, at the auto-tagging system with the processor, a plurality of features corresponding to the set of prominent frames and the pre-defined section of the audio clip, wherein the plurality of features comprises a brand logo displayed in one or more prominent frames of the set of prominent frames, a brand tagline displayed in the one or more prominent frames of the set of prominent frames and a brand tagline recited corresponding to the pre-defined section of the audio clip;
   comparing, at the auto-tagging system with the processor, each of the plurality of features with corresponding pre-defined set of features; and
   tagging, at the auto-tagging system with the processor, the detected advertisement with a unique tag.

2. The computer-implemented method as recited in claim 1, wherein the pre-defined set of features being stored in a reference database.

3. The computer-implemented method as recited in claim 1, wherein the unique tag being a brand name corresponding to the detected advertisement.

4. The computer-implemented method as recited in claim 1, further comprising extracting, at the auto-tagging system with the processor, a first set of audio fingerprints and a first set of video fingerprints corresponding to a media content broadcasting on the channel, wherein the first set of audio fingerprints and the first set of video fingerprints being extracted sequentially in real time, wherein the extraction of the first set of video fingerprints being done by sequentially extracting one or more prominent fingerprints corresponding to one or more prominent frames of a pre-defined number of frames present in the media content for a pre-defined interval of broadcast.

5. The computer-implemented method as recited in claim 1, further comprising storing, at the auto-tagging system with the processor, the generated set of digital signature values, the first set of audio fingerprints and the first set of video fingerprints in a first database and a second database.

6. The computer-implemented method as recited in claim 1, further comprising, updating, at the auto-tagging system with the processor, a first metadata comprising a set of digital signature values and a first set of video fingerprints corresponding to the detected advertisement in a master database for the unsupervised detection.

7. A computer system comprising:
   one or more processors; and
   a memory coupled to the one or more processors, the memory for storing instructions which, when executed by the one or more processors, cause the one or more processors to perform a method for an automated tagging of one or more advertisements broadcasted on a channel in real time, the method comprising:
   detecting, at an auto-tagging system, the one or more advertisements broadcasted on the channel, wherein the one or more advertisements being detected based on at least one of a supervised detection and an unsupervised detection, wherein the detecting is done by generating a set of digital signature values corresponding to a first set of video fingerprints, wherein the generation of each digital signature value of the set of digital signature values is done by:
   dividing each prominent frame of one or more prominent frames into a pre-defined number of blocks, wherein each block of the pre-defined number of blocks having a pre-defined number of pixels;
   grayscaling each block of each prominent frame of the one or more prominent frames;
   calculating a first bit value and a second bit value for each block of the prominent frame, wherein the first bit value and the second bit value are calculated from comparing a mean and a variance for the pre-defined number of pixels in each block of the prominent frame with a corresponding mean and variance for a master frame in a master database, wherein the first bit value and the second bit value are assigned a binary 0 when the mean and the variance for each block of the prominent frame are less than the corresponding mean and variance of each master frame and wherein the first bit value and the second bit value are assigned a binary 1 when the mean and the variance for each block of the prominent frame are greater than the corresponding mean and variance of each master frame; and obtaining a 32 bit digital signature value corresponding to each prominent frame, wherein the 32 bit digital signature value is obtained by sequentially arranging the first bit value and the second bit value for each block of the pre-defined number of blocks of the prominent frame;

fetching, at the auto-tagging system, a set of prominent frames and a pre-defined section of an audio clip corresponding to a detected advertisement;

retrieving, at the auto-tagging system, a plurality of features corresponding to the set of prominent frames and the pre-defined section of the audio clip, wherein the plurality of features comprises a brand logo displayed in one or more prominent frames of the set of prominent frames, a brand tagline displayed in the one or more prominent frames of the set of prominent frames and a brand tagline recited corresponding to the pre-defined section of the audio clip;

comparing, at the auto-tagging system, each of the plurality of features with corresponding pre-defined set of features; and tagging, at the auto-tagging system, the detected advertisement with a unique tag.

8. The computer system as recited in claim 7, wherein the pre-defined set of features being stored in a reference database.

9. The auto-tagging system as recited in claim 7, further comprising storing, at the auto-tagging system, the generated set of digital signature values, the first set of audio fingerprints and the first set of video fingerprints in a first database and a second database.

10. The auto-tagging system as recited in claim 7, further comprising updating, at the auto-tagging system, a first metadata comprising the set of digital signature values and the first set of video fingerprints corresponding to the detected advertisement in a master database for the unsupervised detection.

11. The auto-tagging system as recited in claim 7, further comprising extracting, at the auto tagging system, a first set of audio fingerprints and a first set of video fingerprints corresponding to a media content broadcasting on the channel, wherein the first set of audio fingerprints and the first set of video fingerprints being extracted sequentially in real time, wherein the extraction of the first set of video fingerprints being done by sequentially extracting one or more prominent fingerprints corresponding to one or more prominent frames of a pre-defined number of frames present in the media content for a pre-defined interval of broadcast.

12. A computer-readable storage medium encoding computer executable instructions that, when executed by at least one processor, performs a method for an automated tagging of one or more advertisements broadcasted on a channel in real time, the method comprising:

detecting, at a computing device, the one or more advertisements broadcasted on the channel, wherein the one or more advertisements being detected based on at least one of a supervised detection and an unsupervised detection, wherein the detecting is done by generating a set of digital signature values corresponding to a first set of video fingerprints, wherein the generation of each digital signature value of the set of digital signature values is done by:

dividing each prominent frame of one or more prominent frames into a pre-defined number of blocks, wherein each block of the pre-defined number of blocks having a pre-defined number of pixels;

grayscaling each block of each prominent frame of the one or more prominent frames;

calculating a first bit value and a second bit value for each block of the prominent frame, wherein the first bit value and the second bit value are calculated from comparing a mean and a variance for the pre-defined number of pixels in each block of the prominent frame with a corresponding mean and variance for a master frame in a master database, wherein the first bit value and the second bit value are assigned a binary 0 when the mean and the variance for each block of the prominent frame are less than the corresponding mean and variance of each master frame and wherein the first bit value and the second bit value are assigned a binary 1 when the mean and the variance for each block of the prominent frame are greater than the corresponding mean and variance of each master frame; and obtaining a 32 bit digital signature value corresponding to each prominent frame, wherein the 32 bit digital signature value is obtained by sequentially arranging the first bit value and the second bit value for each block of the pre-defined number of blocks of the prominent frame;

fetching, at the computing device, a set of prominent frames and a pre-defined section of an audio clip corresponding to a detected advertisement;

retrieving, at the computing device, a plurality of features corresponding to the set of prominent frames and the pre-defined section of the audio clip, wherein the plurality of features comprises a brand logo displayed in one or more prominent frames of the set of prominent frames, a brand tagline displayed in the one or more prominent frames of the set of prominent frames and a brand tagline recited corresponding to the pre-defined section of the audio clip;

comparing, at the computing device, each of the plurality of features with corresponding pre-defined set of features; and tagging, at the computing device, the detected advertisement with a unique tag.

13. The computer-readable storage medium as recited in claim 12, wherein the unique tag being a brand name corresponding to the detected advertisement.

14. The computer-readable storage medium as recited in claim 12, wherein the pre-defined set of features being stored in a reference database.

15. The computer-readable storage medium as recited in claim 12, further comprising instructions for extracting, at the computing device, a first set of audio fingerprints and a first set of video fingerprints corresponding to a media content broadcasting on the channel, wherein the first set of audio fingerprints and the first set of video fingerprints being extracted sequentially in the real time, wherein the extraction of the first set of video fingerprints being done by sequentially extracting one or more prominent fingerprints corresponding to one or more prominent frames of a pre-defined number of frames present in the media content for a pre-defined interval of broadcast.

16. The computer-readable storage medium as recited in claim 12, further comprising instructions for updating, at the computing device, a first metadata comprising the set of digital signature values and the first set of video fingerprints corresponding to the detected advertisement in a master database for the unsupervised detection.

\* \* \* \* \*